United States Patent [19]

Coughlin

[11] Patent Number: 5,197,780
[45] Date of Patent: Mar. 30, 1993

[54] TRANSMISSION DEVICE FOR CABLE CONTROL OF LUMBAR SUPPORT MECHANISM

[75] Inventor: Craig J. Coughlin, Detroit, Mich.

[73] Assignee: Fisher Dynamics Corporation, St. Clair Shores, Mich.

[21] Appl. No.: 658,108

[22] Filed: Feb. 20, 1991

[51] Int. Cl.$^5$ ............................................. A47C 3/00
[52] U.S. Cl. .............................. 297/284.7; 297/284.8; 74/502; 192/48.91
[58] Field of Search ........... 297/284 R, 284 A, 284 B, 297/284 C, 284 D, 284 F, 284 FF, 284 G, 284 H, 311, 342, 406–410, 460; 74/501.6, 502, 471 R; 192/48.91, 67 R; 5/211

[56] References Cited

U.S. PATENT DOCUMENTS

| | | | |
|---|---|---|---|
| 4,136,577 | 1/1979 | Borgersen | 192/48.91 X |
| 4,156,544 | 5/1979 | Swenson et al. | |
| 4,309,058 | 1/1982 | Barley | |
| 4,316,631 | 2/1982 | Lenz et al. | 297/460 |
| 4,354,709 | 10/1982 | Schuster | 297/452 X |
| 4,465,317 | 8/1984 | Schwarz | |
| 4,632,454 | 12/1986 | Naert | |
| 4,668,074 | 5/1987 | Boisset | 297/410 X |
| 4,909,568 | 3/1990 | Del Monte | 297/460 X |
| 5,026,116 | 6/1991 | Del Monte | 297/460 X |

Primary Examiner—Kenneth J. Dorner
Assistant Examiner—James M. Gardner
Attorney, Agent, or Firm—Harness, Dickey & Pierce

[57] ABSTRACT

A transmission apparatus for permitting a seat occupant to selectively and remotely adjust distinct comfort features of a dual-function comfort mechanism corporated into a seating assembly. The transmission apparatus has a dual-positioned control device for defining a first mode position permitting selective actuation of a first cable assembly for causing corresponding adjustment of a first comfort feature. The transmission apparatus further defines a second mode position permitting selective actuation of a second cable assembly for independently adjusting a second comfort feature. The dual-position control device is movably supported within the transmission apparatus and is configured and arranged to be positively located and retained in either of the first or second mode positions for eliminating any lost motion therebetween.

20 Claims, 5 Drawing Sheets

TRANSMISSION DEVICE FOR CABLE CONTROL OF LUMBAR SUPPORT MECHANISM

BACKGROUND AND SUMMARY OF THE INVENTION

The present invention relates generally to seating systems and, more particularly, to a transmission device for selectively controlling independent adjustment of two comfort features integrated into the seating system.

Modernly, comfort mechanisms have been integrated into seating systems for permitting a seat occupant to selectively adjust the "contour" of the seat for maximizing personal comfort and support. More particularly, conventional comfort mechanisms permit the seat occupant to selectively adjust comfort features such as lumbar support, seat support, seat extension and lateral side support for the seat and seat back. Moreover, such comfort mechanisms generally provide infinitely variable adjustment within a predetermined range of movement.

Conventionally, comfort mechanisms having two distinct adjustable comfort features typically employ two separate control devices for permitting independent adjustment. For example, U.S. Pat. No. 4,354,709 to Schuster discloses a manually-operated lumbar support system which has two separate levers for permitting the seat occupant to selectively adjusts its curvature and positional orientation. Alternatively, U.S. Pat. No. 4,632,454 to Naert discloses a lumbar support device having a rotatable hand-wheel for adjusting curvature. In addition, vertical lumbar adjustment is provided by "ratcheting" movement of the hand-wheel.

It is therefore an object of the present invention to provide a transmission apparatus for permitting the seat occupant to selectively and remotely adjust distinct comfort features of a multi-functional comfort mechanisms using a single control device. Furthermore, the transmission apparatus of the present invention is readily adapted for integration into any type of dual-function comfort mechanism used in an adjustable seating system.

It is a further object of the present invention to provide a transmission apparatus having a dual-position control device defining a first operating mode position for selectively controlling remote actuation of a first actuation cable assembly so as to cause corresponding adjustment of a first comfort feature. In addition, the dual-position control device defines a second operating mode position for selectively controlling remote actuation of a second actuation cable assembly so as to cause independent adjustment of a second comfort feature. The dual-position control device is movably supported within the transmission apparatus and is configured and arranged so as to be positively located and retained in either of the first or second operating mode positions for eliminating any lost motion therebetween.

Additional objects, advantages and features of the present invention will become apparent from the following specification and appended claims, taken in conjunction with the accompanying drawings.

DETAIL DESCRIPTION OF THE PREFERRED EMBODIMENTS

Figure 1:
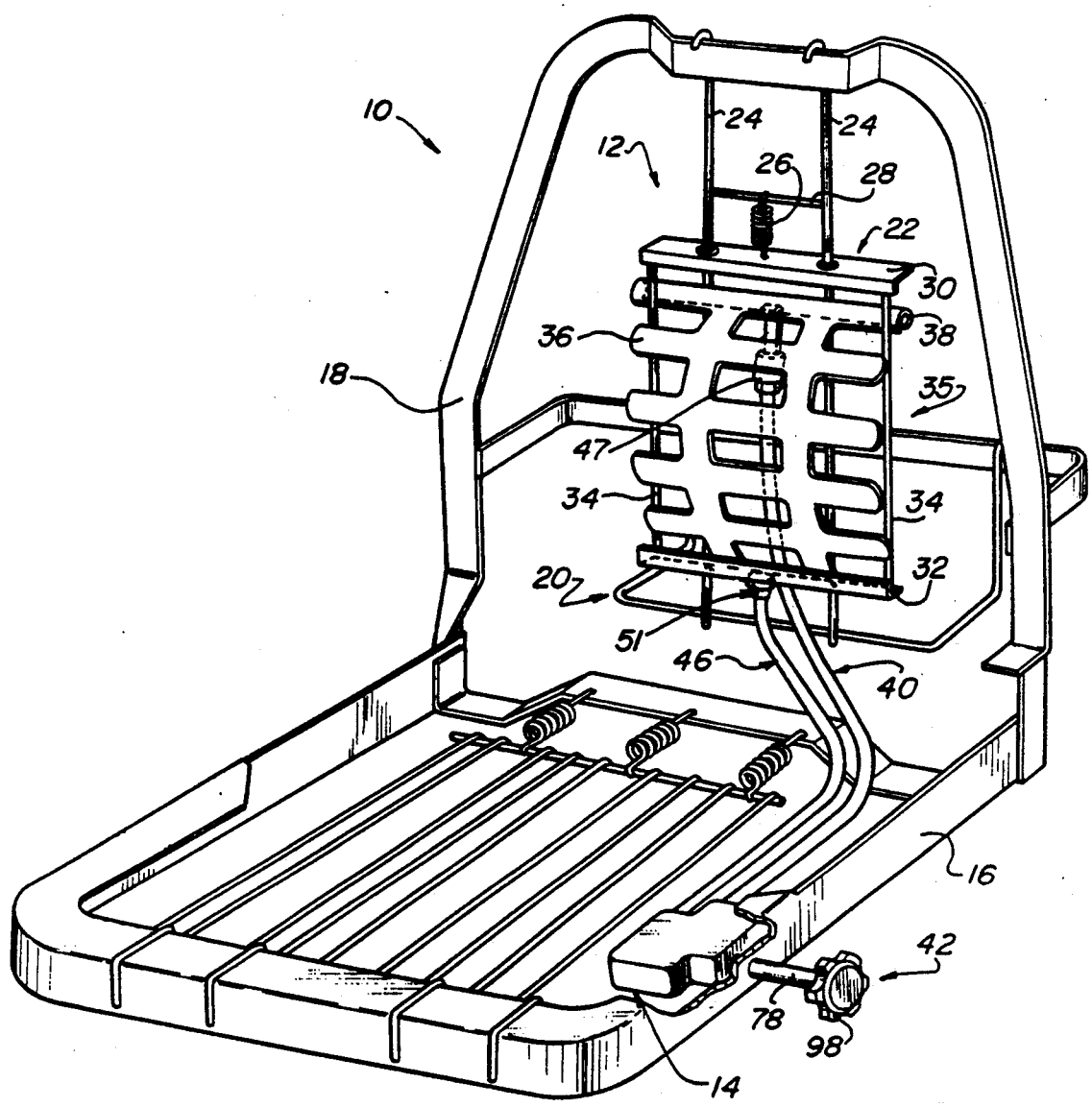
FIG. 1 is a pictorial view of an exemplary lumbar support system integrated into a seat assembly and which is operatively controlled by an improved dual-function transmission apparatus having a dual-position control device constructed in accordance with a first embodiment of the present invention.

Referring now to the drawings, FIG. 1 shows a seating system 10 having an exemplary lumbar support mechanism 12 installed therein. Exemplary lumbar support mechanism 12 is a "dual-function" comfort system providing both horizontal ("in-and-out") curvature adjustment and vertical ("up-and-down") positional adjustment. As such, exemplary lumbar support mechanism 12 has two distinct and independently adjustable comfort features. It will be appreciated that seat system 10 is merely exemplary of the type of seating arrangement that can be installed in virtually any automotive, aircraft or commercial furniture (i.e. office chair) application in which a dual-function comfort mechanism has been suitably integrated. Furthermore, it is to be understood that exemplary lumbar support mechanism 12 is merely intended to illustrate the "dual-position" operation of an improved transmission apparatus constructed according to preferred embodiments of the present invention. As will be appreciated from study of the following description, each improved transmission apparatus is readily adaptable for application in virtually any multi-function comfort systems, which, by way of example, may include a comfort mechanism providing both a lateral seat support adjustment feature and a seat extension adjustment feature.

According to a first preferred embodiment, transmission 14 is shown located in close proximity to seating system 10 for permitting the seat occupant to selectively and independently adjust either of the two comfort features integrated into comfort system 12 to which transmission 14 is operatively coupled. Seat system 10 is shown to include a rigid seat frame 16 and seat back frame 18 from which lumbar support mechanism 12 is supported for movement relative thereto. While not shown, it is contemplated that suitable reclining means may be operatively installed between seat frame 16 and seat back frame 18 for permitting selective reclining movement therebetween. Moreover, exemplary seat assembly 10 is shown with its upholstery and cushion padding removed for clearly illustrating a preferred operative positioning of transmission 14 remote from comfort mechanism 12.

Lumbar support mechanism 12 includes a bracket assembly 20 provided for positioning and supporting a lumbar assembly 22 on seat back frame 18. Bracket assembly 20 includes a pair of spaced vertically extending slide rails 24 which support lumbar assembly 22 for horizontal (i.e. "in and out") curvature adjustment and vertical (i.e. "up and down") positional adjustment. Spring biasing means, such as tension spring 26, is provided for biasing lumbar assembly 22 toward a predetermined "centralized" position. Spring 26 is coupled between a rigid cross-rail 28 extending between vertical slide rails 24 and a upper cross-beam 30 of lumbar support assembly 22. A lower cross-beam 32 of lumbar assembly 22 is interconnected to upper cross-beam 30 by left and right vertical support beams 34 for defining a relatively rigid lumbar frame assembly 35 which is adapted for vertical sliding movement on slide rails 24.

A relatively rigid deflectable bow or lumbar member 36 extend across a substantial width of seat back frame 18 and is fixedly secured at its lower end to lower cross-beam 32. An upper free end 38 of lumbar 36 is movable by means of a first actuation cable assembly 40 for selectively changing the degree of curvature of lumbar 36. More specifically, first cable assembly 40 is operatively coupled between lumbar 36 and a single control device operatively associated with transmission 14 for causing curvature adjustment of lumbar 36 in response to remote actuation of transmission 14 when the control device is located in a first operating mode position. As will be described hereinafter in greater detail, the control device is movable relative to transmission 14 between first and second operating mode positions for independently controlling adjustment of two distinct comfort features. As such, manual rotation of the single control device, shown as a handle assembly 42 of transmission 14, causes corresponding axial movement of a first inner core 44 (FIG. 2) within sheath 45 of first cable assembly 40 when handle assembly 42 is located in its first operating mode position. More particularly, a first end of first inner core 44 is coupled to free end 38 of lumbar 36 such that axial movement of inner core 44 is operable to produce curvature adjustment in response to rotation of handle assembly 42. Preferably, a threaded adjustment device 47 interconnects the first end of first inner core 44 to free end 38 of lumbar 36 for permitting fine assembly adjustment of the curvature of lumbar 36 when handle assembly 42 is in the first operating mode position.

A second actuation cable assembly 46 is operatively coupled between lower cross-beam 32 of lumbar frame assembly 35 and transmission 14 for causing vertical positional adjustment of curved lumbar 36 in response to remote actuation of transmission 14 when handle assembly 42 is in the second operating mode position. In particular, a first end of a second inner core member 48, disposed for axial movement within sheath 49 of second cable assembly 46, is coupled to lower cross-beam 32 of lumbar frame assembly 35 for causing the vertical positional adjustment of lumbar 36 upon rotation of handle assembly 42. Preferably, a second threaded adjustment device 51 interconnects the first end of second inner core 48 to lower cross-beam 32 for permitting fine assembly adjustment of the vertical position of lumbar assembly 22. Therefore, handle assembly 42 is selectively movable with respect to transmission 14 to define the first and second operating mode positions for permitting independent actuation of first and second cable assemblies 40 and 46, respectively, for causing the corresponding curvature and positional adjustments of lumbar support mechanism 12.

Figure 2:
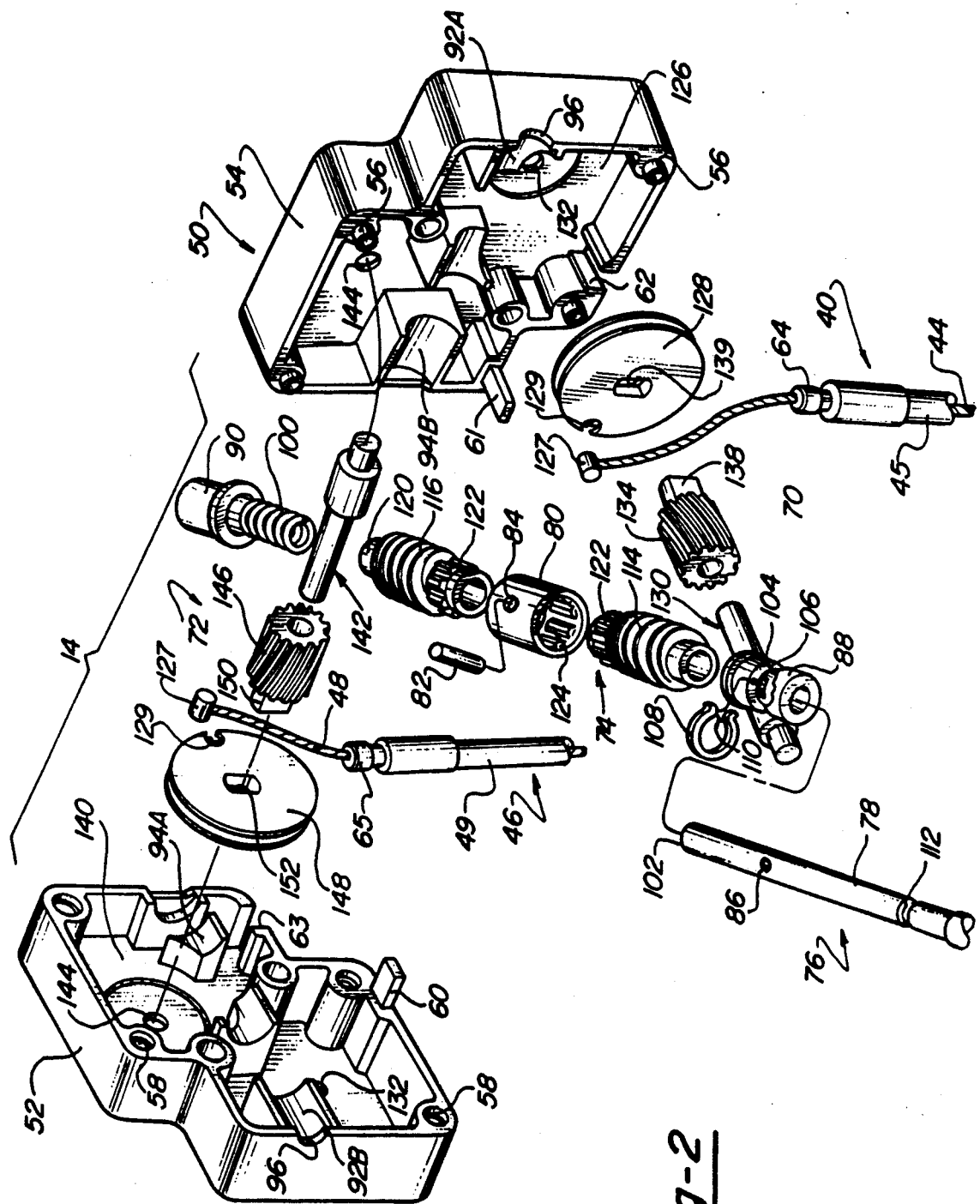
FIG. 2 is an exploded perspective view of the dual-function transmission apparatus of FIG. 1.
Figure 3:
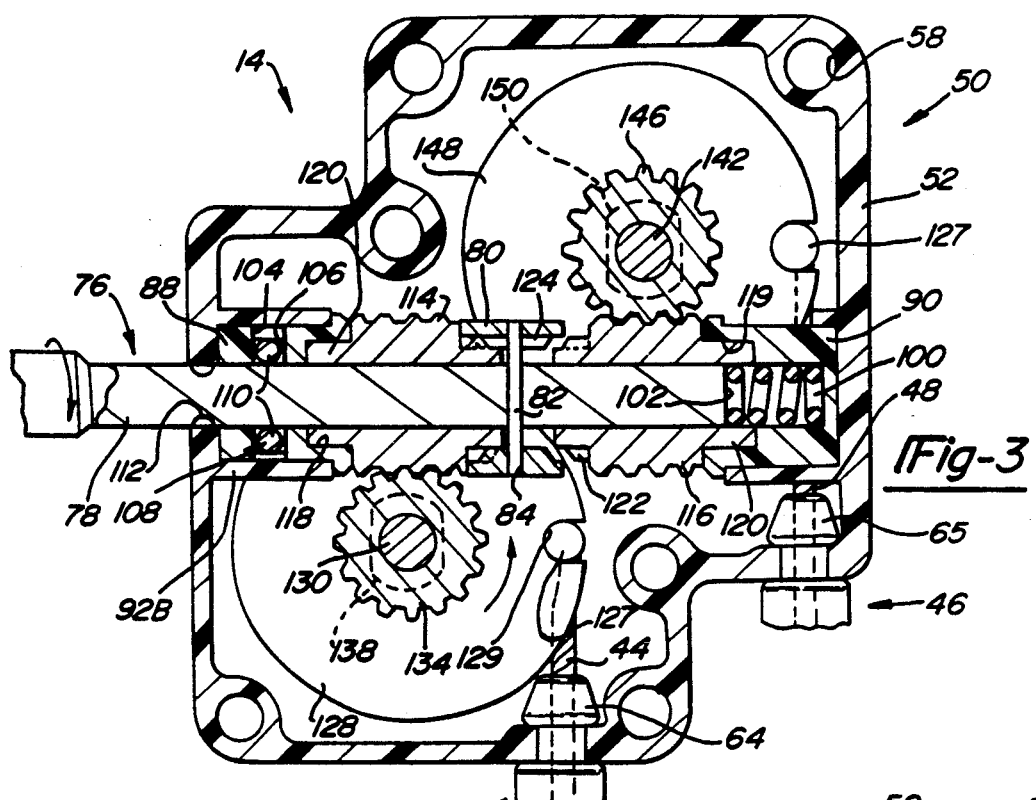
FIG. 3 is a cross-sectional view of the dual-function transmission apparatus illustrating the first operating mode position.
Figure 4:
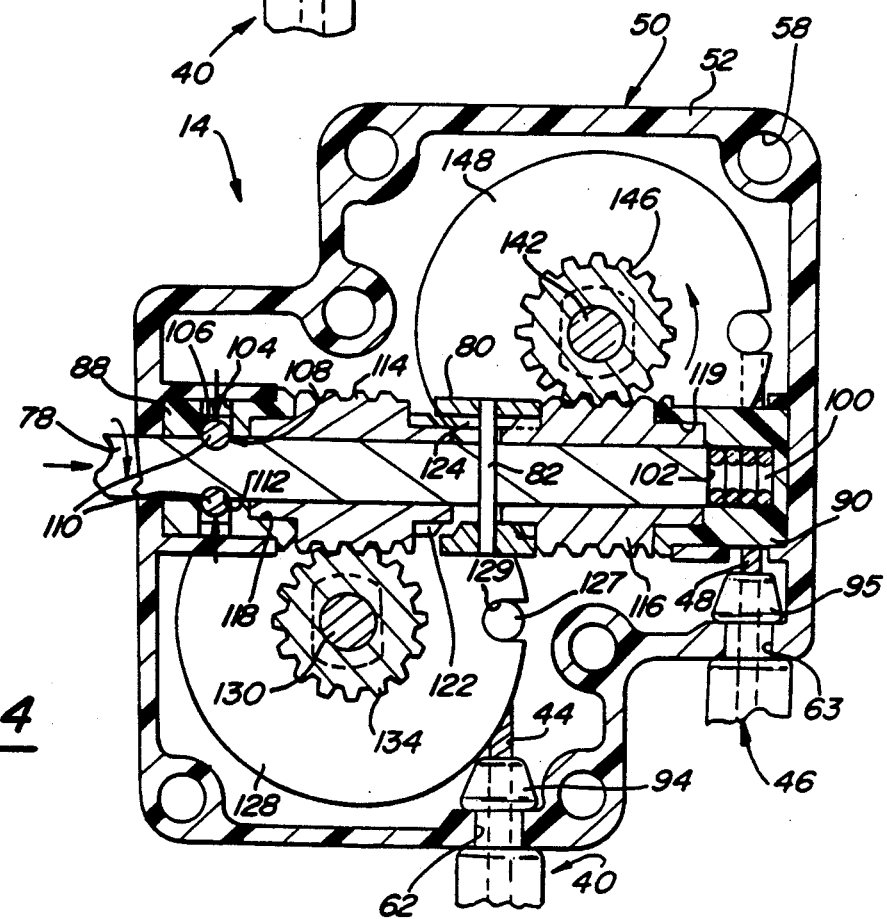
FIG. 4 is a cross-sectional view, similar to FIG. 3, illustrating the second operating mode position of the transmission apparatus.

With particular reference now to FIGS. 2 through 4, the functional and operative arrangement of the various components assembled in transmission 14 are shown in greater detail. In general, transmission 14 permits the seat occupant to change the rotational motion of handle assembly 42 into linear reciprocable motion of one of inner core members 44 and 48 of first and second cable assemblies 40 and 46, respectively. More particularly, transmission 14 is a spring-biased two-position apparatus adapted to permit the seat occupant to selectively and remotely actuate the independent movement of inner cores 44 and 48 using a single control device (i.e. handle assembly 42) for controlling a "dual-function" comfort system. As will be appreciated, the direction and magnitude of linear movement of first inner core member 44 of first cable assembly 40 and, in turn, the degree of curvature adjustment of lumbar 36 is dependent on and proportional to the direction and magnitude of rotation of handle assembly 42 when it is retained in the first operating mode position. In this manner, infinitely variable curvature adjustment is provided within a predetermined range of motion. Likewise, the direction and magnitude of linear movement of second inner cable 48 of second cable assembly 46 and, in turn, the direction and magnitude of vertical positional adjustment of lumbar assembly 22 is dependent on and proportional to the direction and magnitude of rotational movement of handle assembly 42 when it is retained in the second operating mode position.

As best seen in FIG. 2, transmission 14 includes a housing assembly 50 having first and second housing members 52 and 54, respectively, which are adapted for mating engagement upon assembly. Housing assembly 50 is configured to define a series of recesses and integral support stantions for supporting the various components of transmission 14. A plurality of cylindrical posts 56 formed on second housing member 54 are provided for mating receipt in snap receptacles 58 formed in first housing member 52. In addition, alignment keys 60 and 61 are formed on the housing members and are adapted for receipt in slotted keyways 62 and 63, respectively, for inhibiting rotation and aligning the housing members upon final assembly of transmission 14. Slotted keyways 62 and 63 are also adapted to respectively retain sheath end-fittings 64 and 65 formed on the second end of first and second cable assemblies 40 and 46, respectively, therein. Preferably, first and second housing members 52 and 54, respectively, are molded from a relatively rigid plastic material, however it is to be understood that any suitable material can be used.

In general, housing assembly 50 is adapted to support therein a first geared spool assembly 70, a second geared spool assembly 72, a gear drive assembly 74 and a spring-biased rod assembly 76. Rod assembly 76 is an integral portion of handle assembly 42 and comprises an elongated rod 78 and a spacer tube 80. Spacer tube 80 is concentrically mounted on elongated rod 78 via a retention pin 82 disposed transversely within apertures 84 and 86 formed through spacer tube 80 and rod 78, respectively. As such, axial "fore and aft" movement of elongated rod 78 relative to housing assembly 50 causes corresponding axial movement of spacer tube 80. Rod 78 is supported for rotation and axial movement within transmission 14 by first and second tubular sleeve bushings 88 and 90, respectively, which are respectively supported within mating cylindrical support surfaces 92A, 92B and 94A, 94B formed in housing assembly 50. A portion of elongated rod 78 extends from housing assembly 50 through aperture 96 and is coupled to a manually operably lever or hand-wheel 98 (FIG. 1) such that rotation of hand-wheel 98 results in corresponding rotation of elongated rod 78.

Disposed within second sleeve bushing 90 is a coil spring 100 which is adapted to act on a terminal end 102 of elongated rod 78 for normally biasing elongated rod 78 and, in turn, handle assembly 42 outwardly toward the first operative mode position (shown in FIG. 3). First sleeve bushing 88 includes an annular groove 104 having diametrically opposed slots 106 extending therethrough. A snap ring 108 is resiliently disposed within annular groove 104 such that its lower tab portions 110 extend radially inwardly through slots 106 for engaging the outer surface of elongated rod 78. In addition, elongated rod 78 includes a detent groove 112 adapted to receive tabs 110 of snap ring 108 therein for positively positioning and retaining elongated rod 78 in the second operative mode position (shown in FIG. 4). As will be appreciated, when elongated rod 78 is located in the first operative mode position of FIG. 3, tabs 110 of snap ring 108 are disengaged from detent groove 112 and resiliently ride on elongated rod 78.

Gear drive assembly 74 includes first and second worm gears 114 and 116, respectively, which are freely rotatably mounted concentrically on rod 78 intermediate sleeve bushings 88 and 90. Upon assembly, spacer tube 80 is adapted to be positioned between worm gears 114 and 116 for axial movement therebetween upon movement of rod 78 between the first and second operative mode positions. In addition, first and second worm gears 114 and 116, respectively, are retained against axial movement relative to each other and spacer tube 80. First and second sleeve bushings 88 and 90 have a radially outwardly stepped recess 118 and 119, respectively, which are adapted to receive and support the oppositely extending tubular outer ends 120 of worm gears 114 and 116. The opposite ends of worm gears 114 and 116 each have an externally splined surface 122 which are engagable with internal splines 124 formed on spacer tube 80 upon selective "fore or aft" axial movement of rod 78 between the first and second operative mode positions.

With continued reference to FIG. 2, transmission housing assembly 50 defines a first cavity 126 in which first geared spool assembly 70 is supported. First geared spool assembly 70 includes a first spool member 128 having means for securely fixing the second end of first inner core 44 thereto. Such means are shown to include a transverse stop block 127 adapted for receipt in a similarly shaped cut-out 129 in first spool 128. First spool 128 is supported by a first shaft 130 extending between aligned apertures 132 formed in first and second housing members 52 and 54. First shaft 130 is secured for non-rotation within apertures 132 and is substantially enclosed within transmission 14. A first spur gear 134 is journally supported on a stub portion 136 of first shaft 130 and has an apertured key 138 adapted to be received with a mating keyway 139 formed centrally in first spool 128 for coupling first spur gear 134 to first spool 128. First spur gear 134 is positioned within housing assembly 50 to meshingly engage first worm gear 114 as is best seen in FIGS. 3 and 4.

A substantially identical second cavity 140 is formed within first and second transmission housings 52 and 54, respectively, for supporting second geared spool assembly 72 therein. A second shaft 142 is aligned and secured for non-rotation within apertures 144 such that a second spur gear 146, keyed to a second spool 148, is journally supported for rotation thereon. More particularly, apertured key 150 is alignable for receipt within keyway 152 extending through second spool 148. The second end of second inner core 48 is attached to second spool 148 in the manner previously described. Preferably, the orientation and function of second geared spool assembly 72 within transmission 14 is substantially identical to that previously described with reference to first geared spool assembly 70. More particularly, second spur gear 146 meshingly engages and is driven by second worm gear 116 when rod 78 is moved inwardly to its second operative mode position shown in FIG. 4.

In operation, when elongated rod 78 is located in, or selectively shifted to, the first operative mode position (FIG. 3), internal splines 124 of spacer tube 80 drivingly engage external splines 122 of first worm gear 114. Concurrently, internal splines 124 of spacer tube 80 are disengaged from external splines 122 of second worm gear 116. Furthermore, snap ring 108 is resiliently radially deflected such that tabs 110 disengage detent groove 112 whereby the spring biasing force of coil spring 100 acts on terminal end 102 of rod 78 for maintaining splines 124 in engagement with first worm gear splines 122. Therefore, rotation of rod 78 via hand-wheel 98 causes first worm gear 114 to drivingly rotate first spur gear 134 and first spool 128. As such, rotation of hand-wheel 98 by the seat occupant is transferred into linear movement of first inner core member 44 for remotely adjusting the curvature of lumbar 36.

In the second mode position (FIG. 4), spacer tube 80 is positioned such that its internal splines 124 engage external splines 122 of second worm gear 116 for rotatably driving second spur gear 146 and second spool 148 in response to rotation of rod 78. In addition, spacer tube internal splines 124 are disengaged from external splines 122 of first worm gear 114. Moreover, in this second mode position, tabs 110 of snap ring 108 engage detent groove 112 formed on rod 78. Snap ring 108 exerts a sufficient clamping force on rod 78 to overcome the oppositely directed biasing force of spring 100 for retaining rod 78 in the second mode position until the seat occupant deliberately and intentionally pulls out on handle assembly 42. As such, rotation of hand-wheel 98 generates linear motion of second inner core 48 for remotely adjusting the vertical position of lumbar assembly 22.

According to a preferred method of operation, when the seat occupant wants to selectively adjust the first comfort feature (i.e. via movement of first inner cable 44), he pulls outwardly on handle assembly 42 (assuming the control device of transmission 14 is initially located in the second operative mode position) for overcoming the clamping force of snap spring 108 in detent groove 112. In this manner, rod 78 moves outwardly with respect to housing assembly 50 and is retained in the first operative mode position due to the biasing force of coil spring 100. Thereafter, rotation of rod 78 via rotation of hand-wheel 98 in a first direction causes first inner core 44 to be wound on first spool 128 whereby axially linear movement of first inner core 44 acts to increase the curvature of lumbar 36. Alternatively, rotation of hand-wheel 98 and, in turn, rod 78 in an opposite second direction causes first inner core 44 to be unwound from first spool 128 for decreasing the curvature of lumbar 36. Thereafter, if the seat occupant desires to selectively adjust the second comfort feature he pushes inwardly on handle assembly 42 for moving rod 78 toward its second operative position until tabs 110 of snap ring 108 are lockingly disposed within detent groove 112. In this manner, rotation of hand-wheel 98 and rod 72 acts to rotate second spool 148 for winding or unwinding second inner core 48 thereon. As will be appreciated, the direction and extent of linear motion of second inner core 48 and the corresponding vertical positional adjustment of lumbar assembly 22 is dependent on the direction and angular extent of rotation of hand-wheel 98. Moreover, each of the two distinct comfort features can be infinitely variably adjusted within a predetermined range of motion. The adjusted position of each comfort feature is maintained upon release of handle assembly 42 due to the inherent self-locking characteristics associated with meshing engagement of worm gears 114 and 116 with spur gears 138 and 146, respectively.

Figure 5:
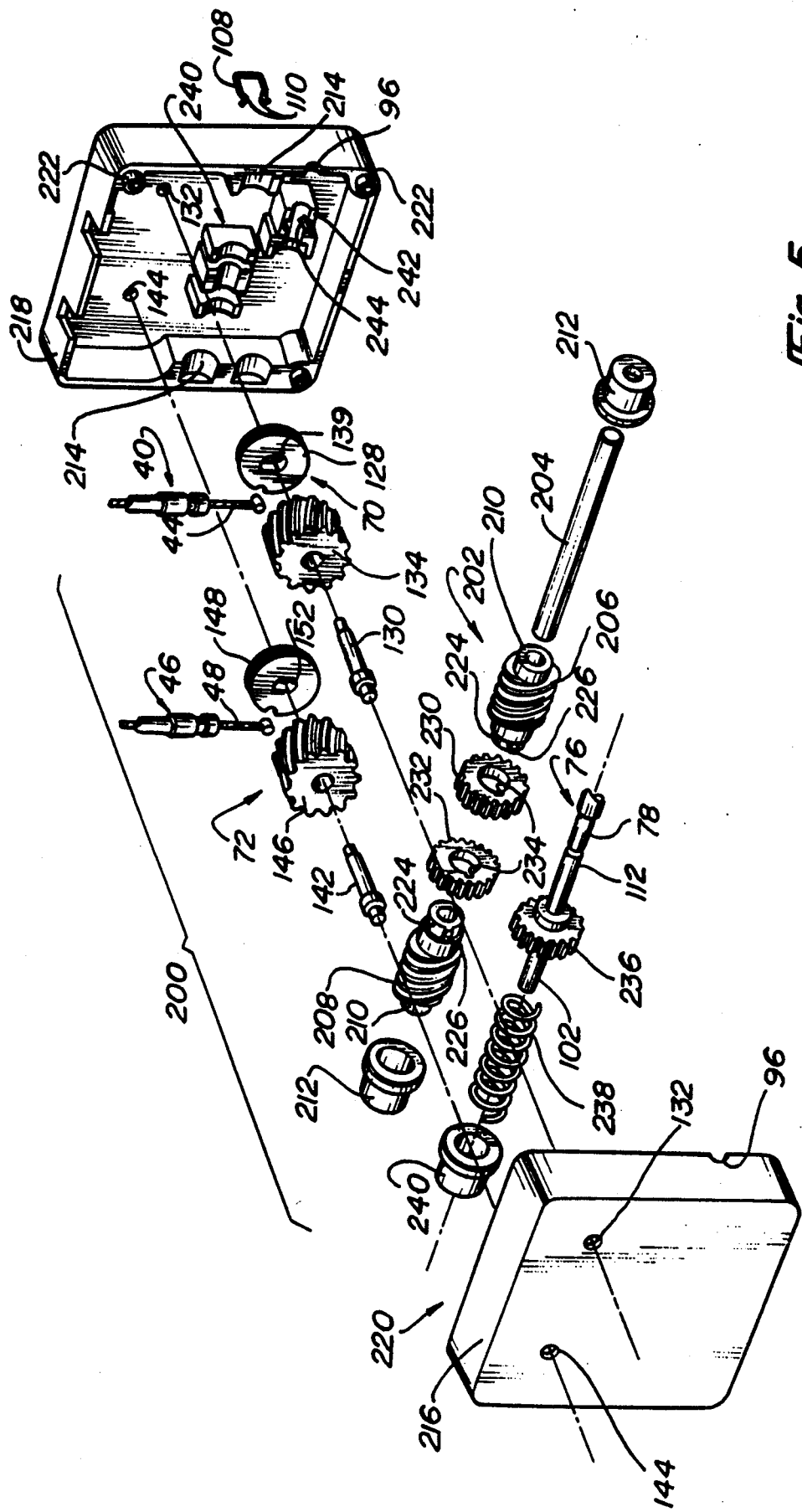
FIG. 5 is an exploded perspective view of a dual-function transmission apparatus according to a second embodiment of the present invention.
Figure 6:
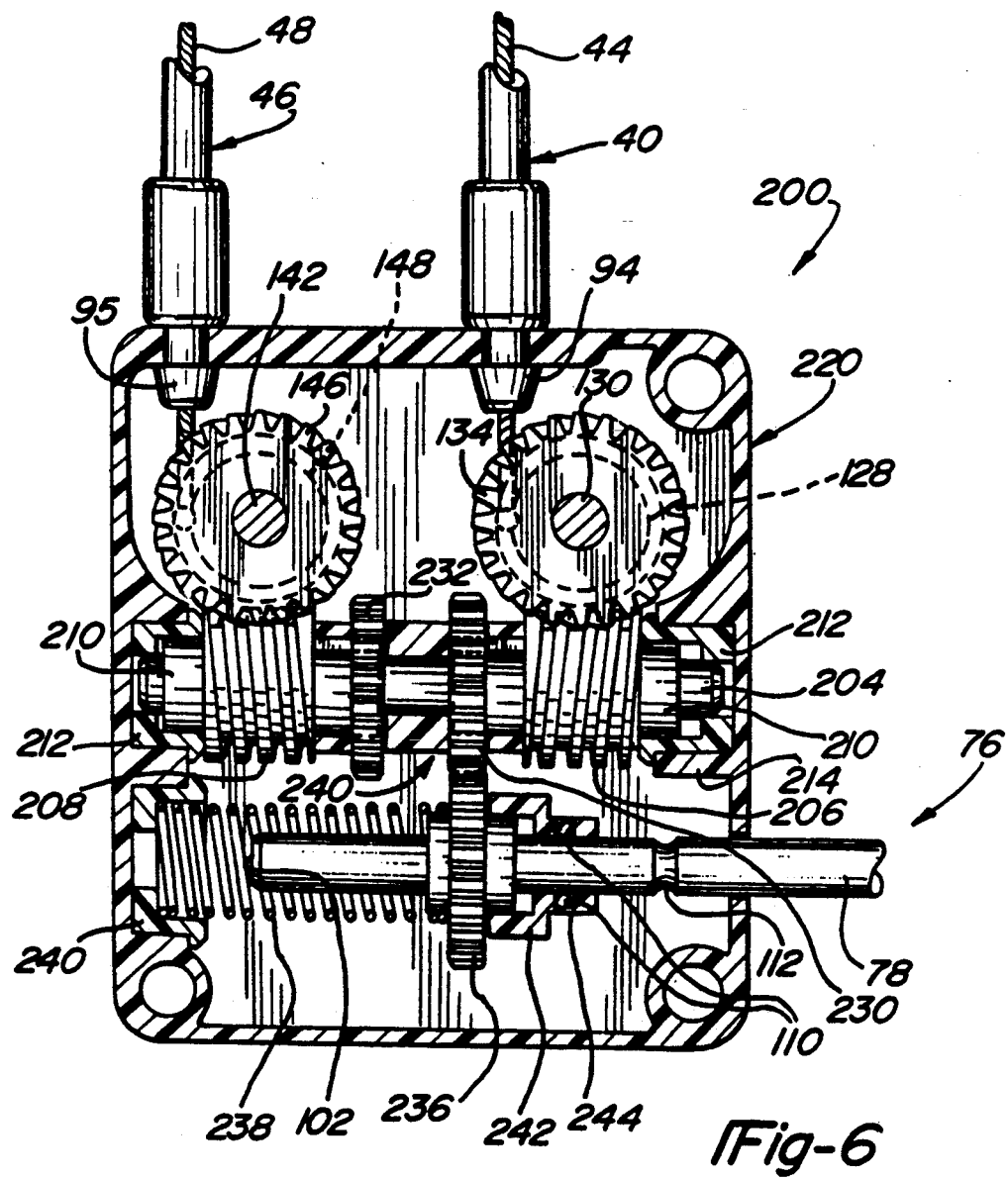
FIG. 6 is a cross-sectional view of the dual-function transmission apparatus shown in FIG. 5.

With reference now to FIGS. 5 and 6, a second embodiment of the present invention is disclosed. More particularly, a dual-position transmission 200 is disclosed which can be readily substituted for transmission 14 for use in seat assembly 10. Furthermore, the function of transmission 200 is substantially identical to that previously described in that transmission 200 is a two-position apparatus adapted to selectively and independently control remote actuation of cable assemblies 40 and 46, each of which is operable for adjusting a distinct comfort feature. As will be appreciated, like numbers are used hereinafter to describe like components previously described.

In general, transmission 200 is an offset apparatus wherein a gear drive assembly 202 is supported on a shaft 204 which is offset from and parallel to elongated rod 78. Gear drive assembly 202 includes first and second worm gears 206 and 208, respectively, which are concentrically supported for rotation on shaft 204. An outer cylindrical end 210 of each worm gear is concentrically disposed and supported within sleeve bushings 212. Sleeve bushings 212 are retained within support stantions 214 formed in complimentary facing surfaces of first and second housing members 216 and 218, respectively, of housing assembly 220. Second housing member 218 includes cylindrical post 222 adapted to be received within snap receptacles (not shown) formed in first housing member 216. The inner end of each of first and second worm gears 206 and 208, respectively, includes a radially stepped cylindrical surface 224 on which a radially projecting key 226 is formed. Keys 226 are provided for lockingly coupling first and second gears 230 and 232, respectively, to first and second worm gears 206 and 208, respectively. A keyway 234 is formed in the central aperture of gears 230 and 232 which is adapted to receive its respective key 226 therein. In addition, support stantions 240 are formed in housing assembly 220 for maintaining a predetermined spacing between gears 230 and 232.

First geared spool assembly 70, substantially identical to that previous described, is supported within transmission housing assembly 220 such that first spur gear 134 meshingly engages first worm gear 206. First worm gear 206 is adapted to transfer the rotational motion of elongated rod 78 to first spur gear 134 and first spool 128 so as to cause first inner core 44 to be wound or unwound thereon when elongated rod 78 is positioned in its first operative mode position for remotely controlling adjustment of the first comfort feature. Furthermore, second geared spool assembly 72 is also supported within transmission housing assembly 220 and includes second spur gear 146 which meshingly engages second worm gear 208. Likewise, second worm gear 208 is adapted to transfer the rotational movement of elongated rod 78 to second spur gear 146 and second spool 148 when elongated rod 78 is positioned in the second operative mode position. In the second mode position, rotation of elongated rod 78 causes rotation of second spool 148 for winding and unwinding second inner cable 48 of second cable assembly 46 thereon for remotely controlling adjustment of the second comfort feature.

With continued reference to FIGS. 5 and 6, a third gear 236 is fixedly secured to elongated rod 78 intermediate terminal end 102 and detent groove 112. A coil spring 238 is supported between bushing 240 and a face surface of third gear 236 for biasing third gear 236 and elongated rod 78 toward the first operative mode position (shown in FIG. 6) wherein third gear 236 meshingly engages first gear 230. An integral stantion 242 is formed in housing assembly 220 which coacts with spring 238 for positively aligning third gear 236 with first gear 230. As such, rotation of third gear 236 via rotation of hand-wheel 98 is transferred to first gear 230 and first worm gear 206 for rotatably driving first geared spool assembly 70. Snap ring 108 is inserted through a pair of opposed apertures 244 formed in stantion 242 of housing assembly 220 such that tab members 110 extend therethrough for engagement with elongated rod 78. As previously described, when it is desired to remotely actuate the second comfort feature, the seat occupant applies an inward force on handle assembly 42 for moving elongated rod 78 inwardly against the biasing of coil spring 238 to a position wherein tabs 110 of snap ring 108 engage detent groove 112. In this manner, elongated rod 78 is retained in the second operative mode position.

As can now be appreciated by those skilled in the art, the present invention is directed to a dual-position transmission apparatuses 14 and 200 having biasing and retaining means which eliminate utilization of a "neutral" position between the first and second operative mode positions. In this manner, the present invention eliminates any lost motion associated with shifting between the "neutral" position and one of the first and second operative mode positions. In addition, the biasing force of coil springs 100, 238 and the clamping force of snap ring 108 are sufficiently equal such that elongated rod 78 will be retained in the desired operative mode position until the seat occupant decides to selectively adjust a different comfort feature. Therefore, the seat occupant is not required to exert and maintain an axially directed load on elongated rod 78 while rotating hand-wheel 98. This provides for increased convenience of operation for the seat occupant.

Because of their modular design, transmissions 14 and 200 of the present invention can be mounted to the right or left side of seat assembly 10 so as to permit use on either the driver or passenger seat of a motor vehicle. Furthermore, the present invention is readily adaptable for use in virtually all seating arrangements for trucks, buses, recreational vehicles and the like. In addition, the transmission devices are also readily adaptable for application to comfort systems integrated into office chairs and upholstered furniture.

Those skilled in the art can appreciate that other advantages can be obtained from the use of this invention and that modification can be made without departing from the true spirit of the invention after studying the specification, drawings and following claims.

What is claimed is:

1. A transmission device for independently adjusting first and second comfort features of a comfort mechanism integrated into a seat assembly, said transmission device comprising:

a housing assembly located remotely from the comfort mechanism;

a gear drive assembly having first and second gear means supported for rotation within said housing assembly;

an elongated rod partially supported for rotation within said housing assembly, said elongated rod being movable with respect to said housing assembly between a first position and a second position;

first spool means operable to be rotatably driven by said first gear means;

first actuation means coupled at one end to said first spool means and adapted to be coupled at its other end to the first comfort feature of the comfort mechanism;

second spool means operable to be rotatably driven by said second gear means;

second actuation means coupled at one end to said second spool means and adapted to be coupled at its other end to the second comfort feature of the comfort mechanism;

coupling means for coupling said rod to said first gear means when said rod is in said first position so as to actuate said first actuation means in response to rotation of said rod for selectively adjusting the first comfort feature, and wherein said coupling means is operable for coupling said rod to said second gear means when said rod is in said second position so as to actuate said second actuation means in response to rotation of said rod for selectively adjusting the second comfort feature;

manually operable means for permitting a seat occupant to selectively move said rod between said first and second positions, and said manually operable means being operable for permitting said seat occupant to selectively rotate said rod for independently adjusting the first and second comfort features; and retaining means for positively retaining said rod in one of said first and second positions so as to prevent said rod from positively locating in an intermediate position between said first and seconds positions.

2. The transmission device of claim 1, wherein said first spool means includes a first spool member and third gear means rotatably driving said first spool member with said third gear means located in meshing engagement with said first gear means so as to be rotatably driven thereby, and wherein said second spool means includes a second spool member and fourth gear means rotatably driving said second spool member with said fourth gear means located in meshing engagement with said second gear means so as to be rotatably driven thereby.

3. The transmission device of claim 2, wherein said first gear means includes a first worn gear and said third gear means is a first spur gear meshingly engaging said first worm gear, and wherein said second gear means includes a second worm gear and said fourth gear means is a second spur gear meshingly engaging said second worm gear.

4. The transmission device of claim 3, wherein said first actuation means comprising a first cable assembly including first core means having a first end adapted to be coupled to the first comfort feature and a second end coupled to said first spool member, said second end of said first core means adapted to be wound on and unwound from said first spool member in response to rotation of said elongated rod when said rod is in said first position, and said second actuation means comprising a second cable assembly including second core means having a first end adapted to be coupled to the second comfort feature and a second end coupled to said second spool member, said second end of said second core means adapted to be wound on and unwound from said second spool member in response to rotation of said rod when said rod is in said second position.

5. The transmission device of claim 4, wherein said retaining means includes spring biasing means for biasing said elongated rod toward said first position, and wherein said retaining means further comprises a snap ring adapted to engage a detent groove formed in said elongated rod when said elongated rod is in second position, the biasing force exerted by said spring biasing means and the clamping force exerted by said snap ring being substantially equal such that said elongated rod is movable between said first and second positions upon said seat occupant deliberately exerting an axially directed force on said manually operable means.

6. The transmission device of claim 5, wherein said manually operable means is a handle assembly coupled to said elongated rod and having a rotatable hand-wheel adapted to cause corresponding rotation of said elongated rod and coupling means.

7. The transmission device of claim 6, wherein said first and second worm gears have means for releasably engaging said coupling means such that said coupling means rotatably drives said first worm gear in response to rotation of said handle assembly when said rod is in said first position, and said coupling means rotatably driving said second worm gear in response to rotation of said handle assembly when said rod is in said second position.

8. The transmission device of claim 7, wherein said gear drive assembly is concentrically disposed for rotation on said elongated rod with said first and second worm gears having external spline means formed thereon, said coupling means comprising a spacer tube disposed concentrically on said elongated rod intermediate said first and second worm gears and adapted for movement therebetween in response to axial movement of said elongated rod, said spacer tube having internal spline means adapted to engage said external spline means of said first worm gear when said rod is in said first position, and wherein said internal spline means of said spacer tube is adapted to engage said external spline means of said second worm gear when said elongated rod is in said second position.

9. The transmission device of claim 7, wherein said gear drive assembly is supported on a shaft offset from said elongated rod, and wherein said gear drive assembly further includes fifth gear means coupled to said first worm gear and sixth gear means coupled to said second worm gear, said coupling means comprising seventh gear means supported on said rod and adapted to meshingly engage said fifth gear means when said rod is in said first position, and said seventh gear means adapted to meshingly engage said sixth gear means when said elongated rod is in said second position.

10. The transmission device of claim 7, wherein the comfort mechanism is a lumbar support mechanism, said first end of said first core means adapted for interconnection to a deflectable lumbar member for adjusting the curvature thereof in response to rotation of said handle assembly when said rod is retained in said first position, said first end of said second core means being adapted for interconnection to a frame portion of said lumbar support mechanism for adjusting the vertical position of said lumbar member in response to rotation of said handle assembly when said rod is retained in said second position.

11. A seat assembly comprising:

a seat member;

a seat back coupled to said seat member;

a dual-function comfort mechanism supported from said seat assembly and operable to permit a seat occupant to selectively adjust first and second comfort features;

transmission means for permitting said seat occupant to independently adjust said first and second comfort features, said transmission means comprising:

a housing assembly located remotely from said comfort mechanism;

a gear drive assembly having first and second gear means supported for rotation within said housing assembly;

an elongated rod partially supported for rotation within said housing assembly, said elongated rod being movable with respect to said housing assembly between a first position and a second position;

first spool means operable to be rotatably driven by said first gear means;

first actuation means coupled at one end to said first spool means and adapted to be coupled at its other end to said first comfort feature of said comfort mechanism;

second spool means operable to be rotatably driven by said second gear means;

second actuation means coupled at one end to said second spool means and adapted to be coupled at its opposite end to said second comfort feature of said comfort mechanism;

coupling means for coupling said rod to said first gear means when said rod is in said first position so as to actuate said first actuation means in response to rotation of said rod for selectively adjusting said first comfort feature, and wherein said coupling means is operable for coupling said rod to said second gear means when said rod is in said second position so as to actuate said second actuation means in response to rotation of said rod for selectively adjusting said second comfort feature;

manually operable means for permitting said seat occupant to selectively move said rod between said first and second positions, and said manually operable means also being operable for permitting said seat occupant to selectively rotate said rod for independently adjusting said first and second comfort features; and retaining means for positively locating said rod in one of said first and second positions so as to prevent said rod from positively locating in an intermediate position between said first and second positions.

12. The seat assembly of claim 11, wherein said first spool means includes a first spool member and third gear means rotatably driving said first spool member with said third gear means located in meshing engagement with said first gear means so as to be rotatably driven thereby, and wherein said second spool means includes a second spool member and fourth gear means rotatably driving said second spool member with said fourth gear means located in meshing engagement with said second gear means so as to be rotatably driven thereby.

13. The seat assembly of claim 12, wherein said first gear means includes a first worm gear and said third gear means is a first spur gear meshingly engaging said first worm gear, and wherein said second gear means includes a second worm gear and said fourth gear means is a second spur gear meshingly engaging said second worm gear.

14. The seat assembly of claim 13, wherein said first actuation means comprises a first cable assembly including first core means having a first end adapted to be coupled to said first comfort feature and a second end coupled to said first spool member, said second end of said first core means adapted to be wound on and unwound from said first spool member in response to rotation of said elongated rod when said rod is in said first position, and said second actuation means comprising a second cable assembly including second core means having a first end adapted to be coupled to said second comfort feature and a second end coupled to said second spool member, said second end of said second core means adapted to be wound on and unwound from said second spool member in response to rotation of said rod when said rod is in said second position.

15. The seat assembly of claim 14, wherein said retaining means includes spring biasing means for biasing said elongated rod toward said first position, and wherein said retaining means further comprises a snap ring adapted to engage a detent groove formed in said elongated rod when said elongated rod is in said second position, the biasing force exerted by said spring biasing means and the clamping force exerted by said snap ring being substantially equal such that said elongated rod is movable between said first and second positions upon said seat occupant deliberately exerting an axially directed force on said manually operable means.

16. The seat assembly of claim 15, wherein said manually operable means is a handle assembly coupled to said elongated rod and having a rotatable hand-wheel adapted to cause corresponding rotation of said elongated rod and said coupling means.

17. The seat assembly of claim 16, wherein each of said first and second worm gears have means for releasably engaging said coupling means such that said coupling means rotatably drives said first worm gear in response to rotation of said handle assembly when said rod is in said first position, and said coupling means rotatably driving said second worm gear in response to rotation of said handle assembly when said rod is in said second position.

18. The seat assembly of claim 17, wherein said gear drive assembly is concentrically disposed for rotation on said elongated rod with said first and second worm gears having external spline means formed thereon, said coupling means comprising a spacer tube disposed concentrically on said elongated rod intermediate said first and second worm gears and adapted for movement therebetween in response to axial movement of said elongated rod, said spacer tube having internal spline means adapted to engage said external spline means of said first worm gear when said rod is in said first position, and wherein said internal spline means of said spacer tube is adapted to engage said external spline means of said second worm gear when said elongated rod is in said second position.

19. The seat assembly of claim 17, wherein said gear drive assembly is supported on a shaft offset from said elongated rod, and wherein said gear drive assembly further includes fifth gear means coupled to said first worm gear and sixth gear means coupled to said second worm gear, said coupling means comprising seventh gear means supported on said rod and adapted to meshingly engage said fifth gear means when said rod is in said first position, and said seventh gear means adapted to meshingly engage said sixth gear means when said elongated rod is in said second position.

20. The seat assembly of claim 17, wherein said dual-function comfort mechanism is a lumbar support mechanism supported from said seat back, said first end of said first core means being interconnected to said first comfort feature defining a deflectable lumbar member for adjusting the curvature thereof in response to rotation of said handle assembly when said rod is retained in said first position, said first end of said second cored means being interconnected to said second comfort feature defining a frame portion of said lumbar support mechanism for adjusting the vertical position of said lumbar member in response to rotation of said handle assembly when said rod is retained in said second position, whereby said transmission means is located remote from said comfort mechanism for permitting said seat occupant to selectively and independently adjust said first and second comfort features by positioning said rod in one of said first and second positions and thereafter selectively rotating said handle assembly.

* * * * *